(No Model.) 2 Sheets—Sheet 1.

J. G. FERRILL.
ROTARY HARROW.

No. 542,587. Patented July 9, 1895.

WITNESSES:
Fred G. Dieterich
Jas. A. Ryan

INVENTOR
James G. Ferrill.
BY Munn & Co.
ATTORNEYS.

(No Model.) 2 Sheets—Sheet 2.
J. G. FERRILL.
ROTARY HARROW.
No. 542,587. Patented July 9, 1895.
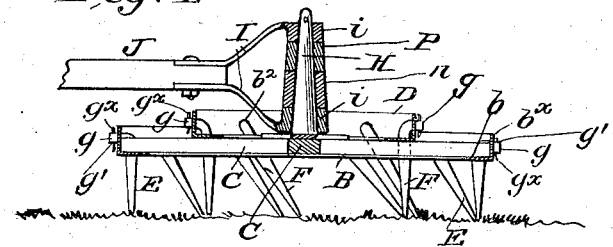
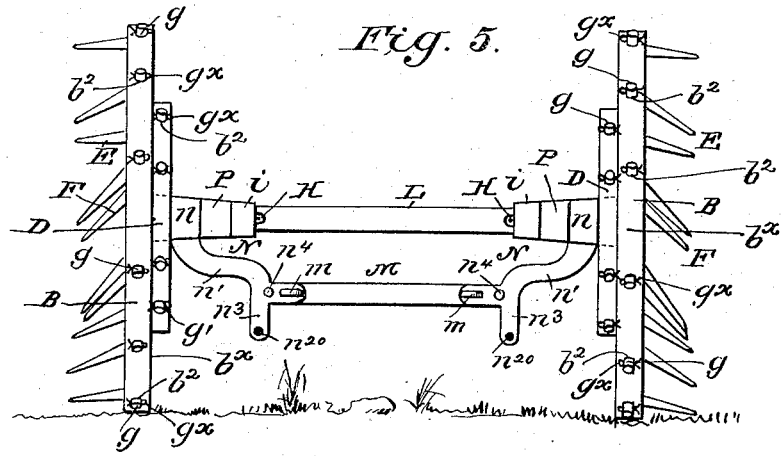
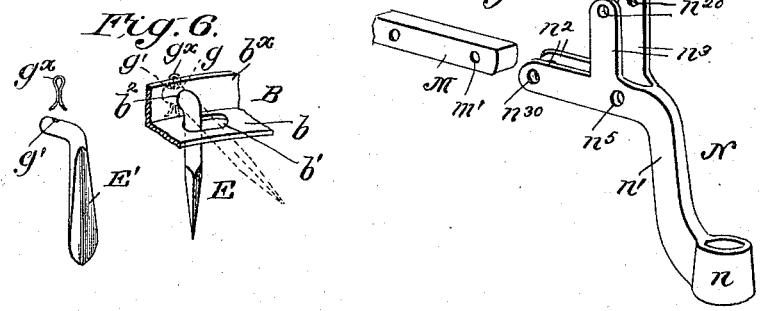
WITNESSES:
Fred G. Dieterich
Jos. A. Ryan
INVENTOR
James G. Ferrill.
BY Munn & Co.
ATTORNEYS.

UNITED STATES PATENT OFFICE.

JAMES G. FERRILL, OF BATESVILLE, ARKANSAS.

ROTARY HARROW.

SPECIFICATION forming part of Letters Patent No. 542,587, dated July 9, 1895.

Application filed January 19, 1895. Serial No. 535,509. (No model.)

*To all whom it may concern:*

Be it known that I, JAMES G. FERRILL, residing at Batesville, in the county of Independence and State of Arkansas, have invented a new and Improved Rotary Harrow, of which the following is a specification.

My invention is an improvement in that class of rotary harrows having two toothed rotary sections that are hinged to a transverse coupling-bar in such manner as to permit them to be placed in horizontal or vertical position, as required for work or transportation to or from the field.

The features of novelty are hereinafter pointed out.

Figure 1:
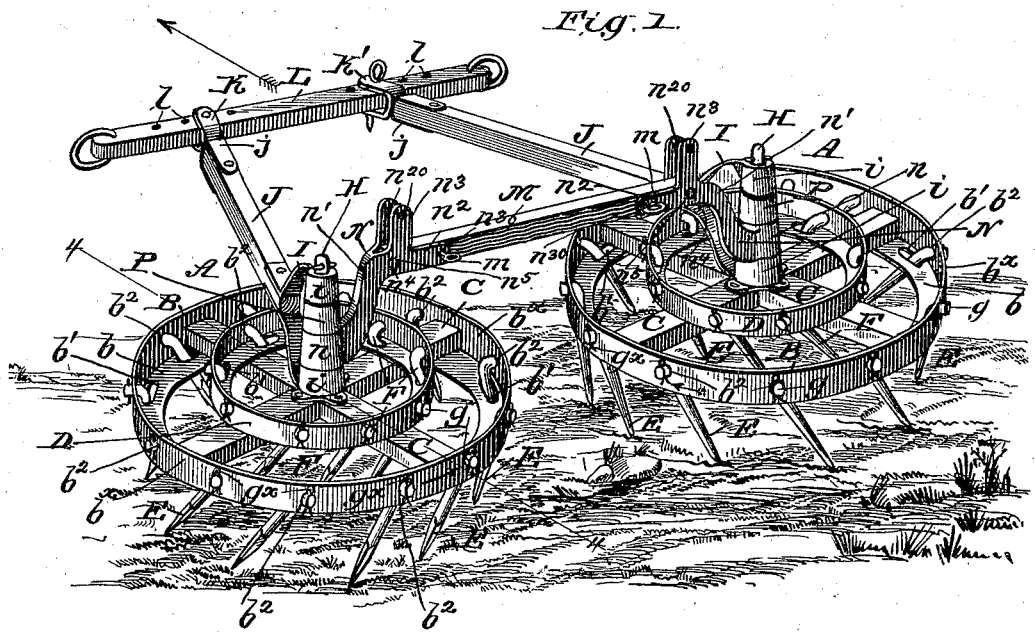
Figure 2:
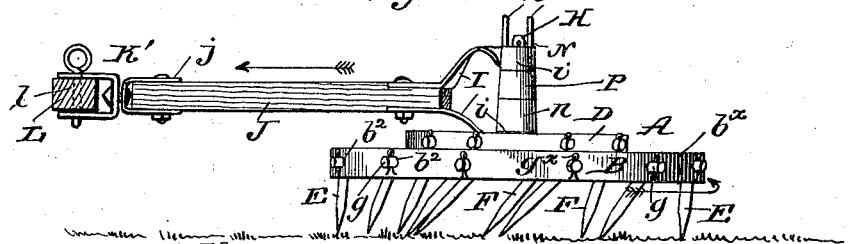
Figure 3:
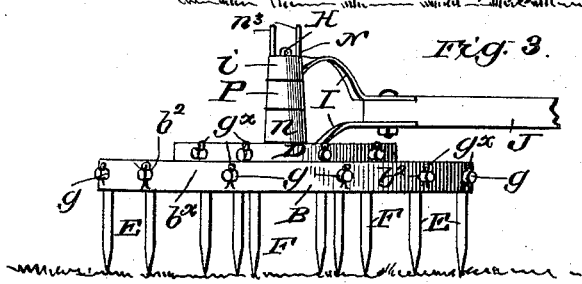

Figure 1 is a perspective view of my improved double rotary harrow, the parts being shown adjusted to form a smoothing-harrow. Fig. 2 is a side elevation thereof. Fig. 3 is a side elevation of the same, showing the draft-frame swung around to pull upon the disks in a reverse direction to that shown in Figs. 1 and 2. Fig. 4 is a section of one of the harrow disks or frames and its bearing-yoke, taken practically on the line 4 4 of Fig. 1. Fig. 5 is a rear view of my improved harrow, showing the harrow-disks proper turned up to form drive-wheels. Fig. 6 is a detail view illustrating the manner of connecting the teeth to the harrow-frame, and Fig. 7 is a similar view of one of the connecting-bar coupling-sections hereinafter referred to.

My improved harrow comprises two rotary or disk sections A A constructed alike, each of which consists of an outer annular rim or member B, formed preferably of angle-steel, to the base $b$ of which is secured a pair of cross-beams C C, upon which is secured an inner circle or annular rim D, also formed of angle steel or iron. The outer angle member B has its base formed with a series of elongated openings $b'$, while the vertical flange $b^\times$ has apertures $b^2$, one for each opening $b'$, arranged at one end thereof, as most clearly shown in Fig. 6 and for a purpose presently described.

In practice the member B will have twelve or more sets of apertures $b'$ $b^2$, while the inner one will have eight, more or less, and in such apertures are secured and held movable the harrow-teeth E F, the ones F, which are secured to the inner circle member D, being necessarily longer than the ones E, as will be clearly understood from the drawings.

By referring more particularly to Fig. 6, it will be seen the harrow-teeth G are each formed at the upper end with a right-angled portion $g$, having an aperture $g'$, and such teeth, when connected with the circle members B and D, have their shanks fitted in the elongated apertures $b'$ and their angle portions $g$ journaled in the apertures $b^2$, they being detachably held in position by the spring-keys $g^\times$, which fit in the apertures $g'$. By connecting the said teeth in the manner stated and shown with the disk members B and D, it is manifest that when the draft devices are adjusted in the position shown in Figs. 1 and 2 the teeth, which are loosely held in the elongated apertures, will swing back at an angle as they are drawn over the ground, they being, as it were, in the nature of flexible teeth when the parts are adjusted, as shown in the said Figs. 1 and 2, such arrangement of the harrow being best adapted for use on sandy or loose ground.

When it is desired to use the harrow on rough or stalky ground, the draft members of the frame are shifted to pull in a reverse direction, (in a manner presently explained,) and when pulled in this direction the teeth, owing to their being pivoted at a point over one end of the elongated apertures $b'$, will assume practically a vertical or rigid position, as shown most clearly in Fig. 3. When used more particularly for cutting corn or cotton stalks, the plain teeth G are removed and flat cutter-like teeth, such as is indicated by G' in Fig. 6, are used in place thereof.

Referring now again to Fig. 1, it will be seen the rotary-harrow sections have each a spindle H, journaled in the eye members $i\ i$ of the yokes I, formed on the rear end of the draft-beams J, the front ends of which have a swivel connection $j$ with clevis members K K', connected with the draft-bar L. This bar, it will be noticed, has a series of apertures $l\ l$, whereby the clevis members can be adjustably connected therewith, it being obvious that the speed of rotation of the harrow-sections is governed by the adjustment of the draft-beams with the draft-bar, as the nearer to the center of such bar the beams are connected the faster the sections will revolve. One of the clevises K' has a removable pin connection with the draft-bar, whereby it can be readily disconnected therefrom. By removing this pin and swinging the draft-bar and the beams around and turning the draft-bar over and attaching the clevis K' as before, the machine will be in position to travel and operate in a reverse direction.

M indicates the coupling-bar which connects the sections A A together, the construction of which is best shown in Fig. 4. This bar is made arched so the sections will not strike it in going across rows or very rough places.

To the ends of the bar M are pivotally connected by the pins $m$ the coupling-castings N, each of which comprises a foot portion $n$, apertured to fit upon the spindles H, and an arched-like member $n'$, terminating in a forked portion, having a pair of horizontal fingers $n^2$ and a pair of vertical fingers $n^3$, each of which are apertured at the outer ends, as at $n^{20}$ $n^{30}$, the members $n'$ being also apertured, as at $n^4$, at the junction of the finger members $n^2$ and $n^3$, to receive the pivot-pins $n$, as most clearly shown in Fig. 5.

By connecting the coupling-bar M and providing the casting W with a double pair of fingers, as stated, it is only necessary, when it is desired to turn the harrow sections or disks A A into drive-wheels, to pull out the pins O, which pass through the bar M and the ends of the fingers $n^2$, and turn up the sections to a vertical position, in which it can be held by the pins O, which are passed through the apertures in the bar M and in the ends of the fingers $n^3$, which at this time will be in register with the apertures O' in the bar M. To form a solid bearing for the spindles H washers P are interposed between the upper yoke-eye and the apertured foot members of the casting N.

Having thus described my invention, what I claim, and desire to secure by Letters Patent, is—

In a harrow essentially as described a harrow section comprising an outer annular rim, cross bars fixedly connected therewith, having a central spindle member projected upward therefrom, an inner annular rim secured on the said cross bars, and pendent tooth members loosely connected with the aforesaid inner and outer annular members all arranged substantially as shown and described.

JAMES G. FERRILL.

Witnesses:
A. G. JONES,
PRESTON FERRILL.